Figure 1:
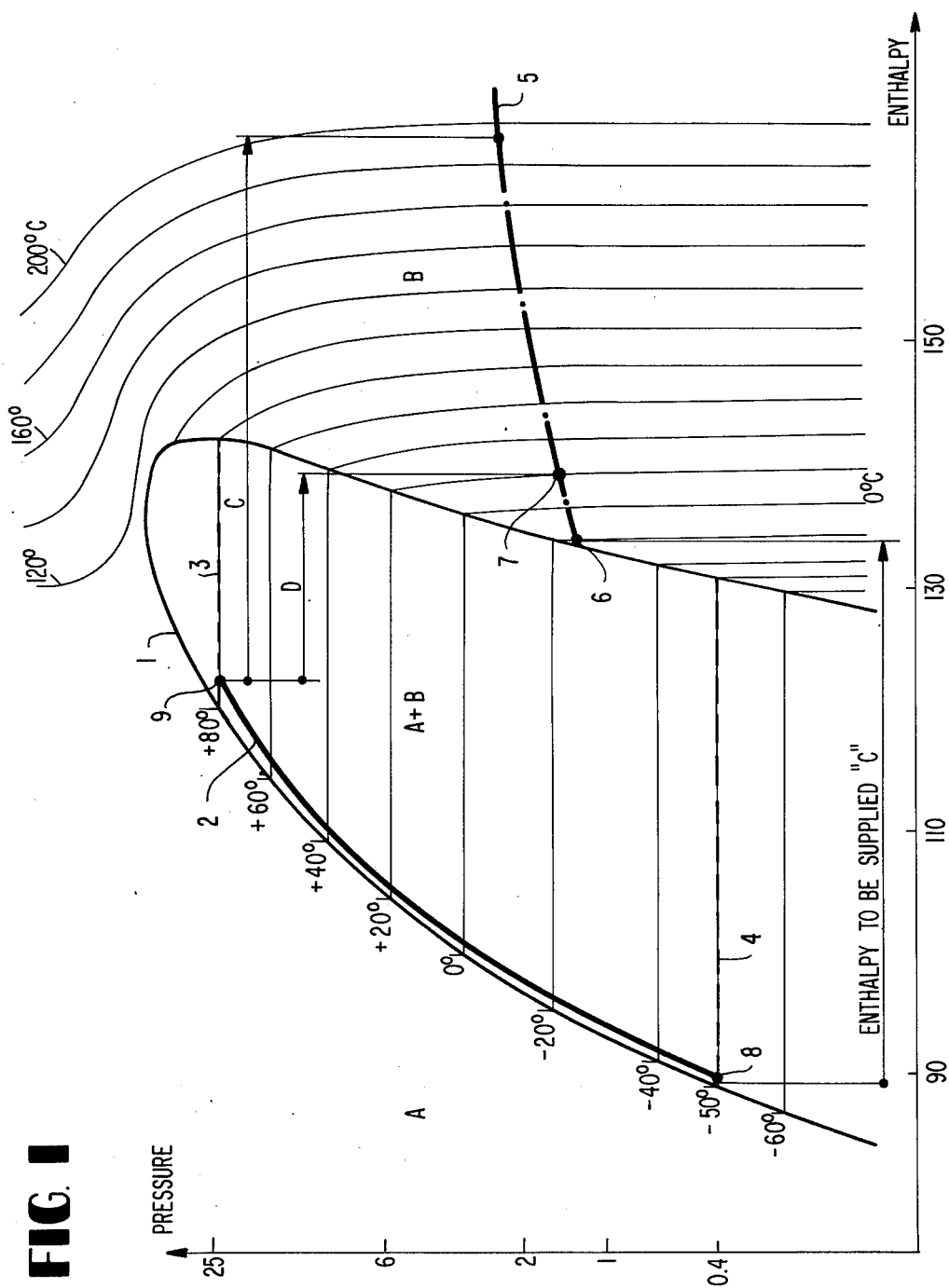

United States Patent

Wulf et al.

[11] 4,026,580
[45] May 31, 1977

[54] TEMPERATURE MAINTAINING DEVICE FOR SAFETY GAS CUSHION

[75] Inventors: Helmut Wulf, Nellingen; Gerhard Schiesterl, Stuttgart; Hansjürgen Scholz, Echterdingen, all of Germany

[73] Assignee: Daimler-Benz Aktiengesellschaft, Germany

[22] Filed: Nov. 1, 1971

[21] Appl. No.: 194,355

[30] Foreign Application Priority Data

Nov. 2, 1970 Germany .......................... 2053773

[52] U.S. Cl. .............................. 280/736; 23/281; 137/341; 280/742
[51] Int. Cl.² ......................................... B60R 21/08
[58] Field of Search ............ 23/281, 282; 219/311; 137/341; 280/741, 742, 737, 736

[56] References Cited

UNITED STATES PATENTS

| | | | |
|---|---|---|---|
| 1,284,876 | 11/1918 | Ackerman et al. ................ | 219/311 |
| 2,037,158 | 4/1936 | Doelling ............................ | 23/281 |
| 3,280,301 | 10/1966 | Anderson et al. ................. | 219/311 |
| 3,287,660 | 11/1966 | Webb ............................... | 23/281 X |
| 3,450,414 | 6/1969 | Kobori ......................... | 280/150 AB |
| 3,516,685 | 6/1970 | Goetz ........................... | 280/150 AB |
| 3,606,377 | 9/1971 | Martin ................................ | 23/281 |
| 3,618,974 | 11/1971 | Chute .......................... | 280/150 AB |
| 3,643,971 | 2/1972 | Kushnick .................... | 280/150 AB |

*Primary Examiner*—Joseph F. Peters, Jr.
*Assistant Examiner*—John P. Silverstrim
*Attorney, Agent, or Firm*—Craig & Antonelli

[57] ABSTRACT

A device is disclosed for maintaining the pressurized gas source at a desired temperature in an inflatable, vehicle passenger, safety cushion system. The gas source is heated by a heating source such as the engine cooling water, air heated by the exhaust, or electrical energy, for example. A control system enables heating when the temperature of the gas source is below the desired temperature and disables heating when the gas source temperature is above the desired temperature.

20 Claims, 2 Drawing Figures

TEMPERATURE MAINTAINING DEVICE FOR SAFETY GAS CUSHION

The present invention relates to a safety gas cushion for the protection of the passengers of vehicles, especially of motor vehicles, which is automatically inflatable, when the vehicle exceeds a predetermined deceleration, by way of a pressure gas tank or a pressure gas producing installation.

Such types of gas cushion installations operate generally in such a manner that circuit is closed by a switch, a so-called sensor, actuated in dependence on the deceleration of the vehicle, which leads to the ignition of an explosive charge, by means of which is blasted off, for example, the closure or lid of a compressed gas tank, or which leads to the ignition of a powder charge, which as a result of its heat development heats a liquified gas to such an extent that the pressure increase resulting thereby destroys the closure of the gas tank and now permits the gas to flow into the gas cushion.

The temperatures in motor vehicles vary, as is known, between minus 50° and plus 80° C. As a result of these high temperature differences in the gas tanks, very differing fillings of the inflated gas cushions naturally result after the ignition. Hence, large differences in the end temperature, in the end pressure and in the volume are noted.

The present invention is therefore concerned with the task to avoid these disadvantages and to assure thereby that the pressure, temperature and volume of an inflated gas cushion can fluctuate only within predetermined, relatively small tolerances.

As a solution to the underlying problem, a safety gas cushion is therefore proposed for the protection of the passengers of vehicles, especially of motor vehicles, which is automatically inflatable when the vehicle exceeds a predetermined deceleration, by way of a compressed gas tank or a compressed gas-producing installation, whereby according to the present invention the pressure gas tank or the pressure gas-producing installation is adapted to be heated.

Advantageously, the heating system should thereby be controllable by way of a thermostat in order to keep as small as possible the tolerances in the inflated gas cushion.

Furthermore, it is advantageous if also other portions of the installation, and more particularly the gas cushion itself which is folded-together in the rest position, are adapted to be heated. As a result thereof, the material of the gas cushion remains elastic also at very low temperatures and an icing due to condensed water is precluded.

Accordingly, it is an object of the present invention to provide a safety cushion for the protection of passengers of motor vehicles which avoids by simple means the aforementioned shortcomings and drawbacks encountered in the prior art.

Another object of the present invention resides in a safety gas cushion for the protection of the passengers of vehicles, which minimizes large differences in the end temperature, pressure and volume of the inflated cushion.

A further object of the present invention resides in a system for inflating a safety gas cushion in which pressure, temperature and volume of the inflated gas cushion can fluctuate only within predetermined relatively small tolerances.

Still another object of the present invention resides in a gas cushion system in which the pressure gas tank or pressure gas producing installation is adapted to be heated.

Another object of the present invention resides in a gas cushion of the type described above which remains elastic even at very low temperatures and precludes icing thereof.

Figure 2:
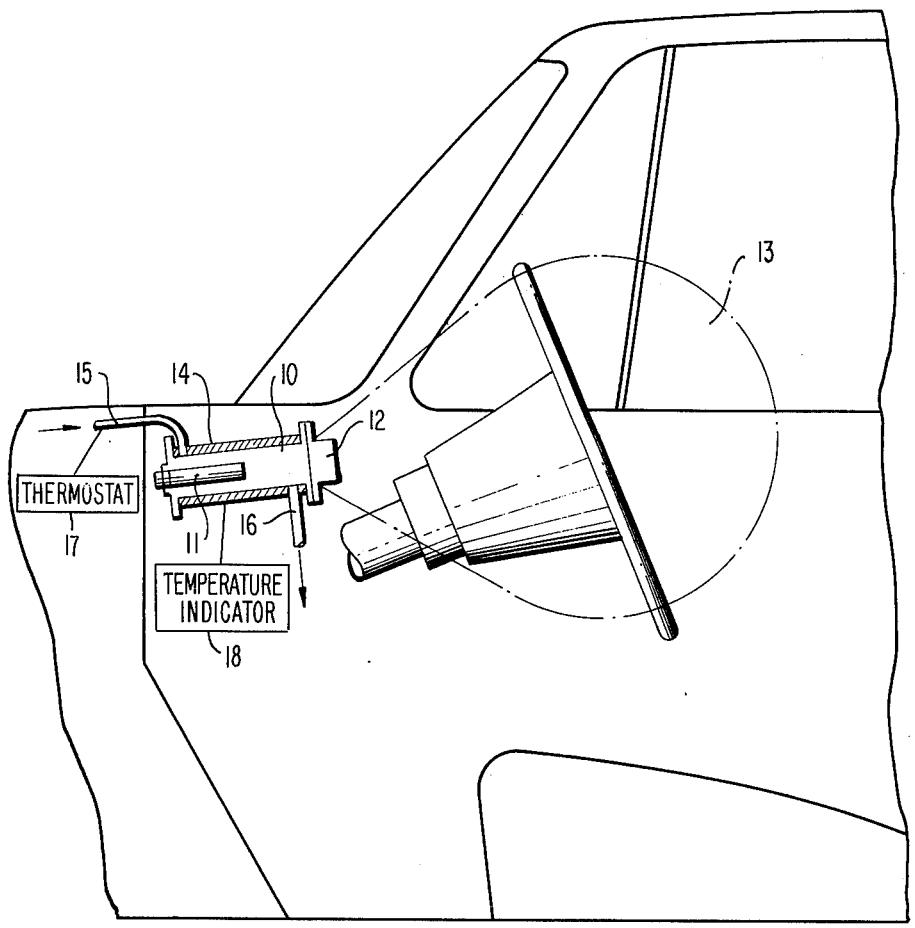

These and further objects, features and advantages of the present invention will become more apparent from the following description when taken in connection with the accompanying drawing which shows, for purposes of illustration only, one embodiment in accordance with the present invention, and wherein:

FIG. 1 is a Mollier-Diagram of Freon 12, explanatory of the theoretical background of the present invention, and FIG. 2 is a somewhat schematic partial cross-sectional view of one embodiment according to the present invention with a heating system by the cooling water of an internal combustion engine (not shown).

Referring now to the drawing, and more particularly to FIG. 1, this figure illustrates the Mollier-Diagram of Freon 12 which is preferably used for filling a gas cushion, for the purpose of explaining the present invention.

Freon 12 is in liquid condition in the left portion of the diagram within the area A, is in liquid and gaseous condition on the inside of the line 1 within the area A + B and is in gaseous condition within the right area B. Freon 12 is normally filled into the tank at minus 30° C and at 1 atmosphere (excess pressure) whereupon the tank is closed. The now occuring entropies of Freon 12 at various outside temperature can be seen from curve 2, which extends between the temperature limits 3 (+80° C) and 4 (−50° C). Line 5 is the selected characteristic line for the volume of the gas cushion which is available, whereby the point 6 represents the smallest magnitude and point 7 the ideal condition.

In order now to reach from line 2 the line 5, so much liquid Freon 12 has to be evaporated that at least point 6 on line 5 is reached. The supply of the heat quantity (enthalpy) required therefor has to take place extraordinarily rapidly whence one utilizes preferably a powder charge. This supplied enthalpy can be read directly from the diagram. In order that all Freon 12 is evaporated at minus 50° C and at least the point 6 is reached, the powder charge must give off at least an enthalpy "C". The inflated gas cushion then has according to the diagram an end temperature of minus 20° C and a pressure of about 1.3 atmospheres.

If now the Freon 12 is heated to plus 80° C (point 9) and the powder charge is ignited with the same enthalpy C, it can be seen from the diagram that the inflated gas cushion now has an end temperature of plus 192° C and an end pressure of 2.4 atmospheres. These large temperature and pressure differences are very disadvantageous in the design of the gas cushion. However, it can be achieved with an installation of a heating system according to the present invention in or about the gas tank that the liquified gas always comes in contact with the ignited powder charge with a defined starting temperature, for example, of plus 80° C as upper operating limit (point 9), and thus always expands to the ideal point 7 along the line 5 (at plus 20° C and 1.8 atmospheres). A further advantage resides in the fact that one is able to get along in this operation with a powder charge smaller by about 60 percent (corresponding to the enthalpy "D" in the diagram).

As a result thereof, also a noise reduction can be realized during the ignition of the powder charge.

If one has another gas cushion system with a purely compressed gas filling, (for example, nitrogen or compressed air) whereby the inside pressures of the gas tank fluctuate with the aforementioned temperature limits between 120 and 200 atmospheres, a constant gas pressure can be achieved by a heating system and thus a smaller gas tank can be used. Likewise, the inflated gas cushion then always exhibits the same temperature-pressure conditions.

A heating of the parts of the gas cushion installation can be realized by any desired heating source, which is available in a vehicle, for example, by the engine cooling water, by a cooling water or by air heated by the exhaust, by vapor, by electrical energy, etc. The heating source, however, should be regulatable in such a manner that a temperature limit of, for example, plus 80° C is not exceeded.

It is also feasible that the gas tank represents a portion of the heating and cooling installation of a motor vehicle.

In case that a readiness indication is required for the gas cushion system, an already present temperature indicator 18 of the cooling water can be utilized therefor either directly or as a component thereof.

In the embodiment of the present invention illustrated in FIG. 2 of the drawing, a gas tank 10 is provided in which is arranged a conventional powder charge 11 which can be ignited by way of a conventional deceleration switch (not shown). Within the space 12 the folded-together gas cushion 13 is accommodated in the normal rest condition whose inflated shape is indicated in dash and dot lines in FIG. 2.

In order to assure a uniform temperature of the gas tank 10 during the operation of the vehicle, the tank 10 is surrounded by a water jacket 14 which is connected by way of pipe lines 15 and 16 with the cooling water system of an internal combustion engine (not shown). The cooling water jacket 14 may thereby be of any conventional construction and any conventional thermostatic control 17 may be used to control the flow of the medium through the jacket 14.

While we have shown and described only one embodiment in accordance with the present invention, it is understood that the same is not limited thereto but is susceptible of numerous changes and modifications as known to those skilled in the art, for example, any other known type of heating and/or cooling means may be used; hence, we do not wish to be limited to the details shown and described herein but intend to cover all such changes and modifications as are encompassed by the scope of the appended claims.

What we claim is:

1. A safety device for the protection of a vehicle occupant, comprising: an inflatable cushion means, a compressed gas source means, means for automatically communicating said gas source means with said cushion means for inflation thereof in response to a vehicle exceeding a predetermined deceleration, means for maintaining said gas source means at a predetermined temperature, said maintaining means including heating means operative for heating said gas source means, and control means for controlling the heating means in dependence upon the temperature of said gas source means, said control means rendering said heating means operative when the temperature of said gas source means is below said predetermined temperature and rendering said heating means inoperative when the temperature of said gas source means reaches approximately said predetermined temperature.

2. A safety device according to claim 1, wherein said gas source means is a compressed gas tank.

3. A safety device according to claim 1, wherein said gas source means is a compressed gas producing installation.

4. A safety device according to claim 1, wherein said control means includes thermostat means for controlling said heating means.

5. A safety device according to claim 4, wherein other parts of the safety device are also adapted to be heated by said heating means.

6. A safety device according to claim 4, wherein said cushion means in the rest position is also adapted to be heated by said heating means.

7. A safety device according to claim 6, further comprising a cooling water temperature indicating means interconnected with a vehicle cooling system for indicating the readiness of the gas cushion system.

8. A safety device according to claim 7, wherein said cooling water temperature indicating means is used directly as readiness indicator.

9. A safety device according to claim 7, wherein said cooling water temperature indicating means is used as a component of the readiness indicator.

10. A safety device according to claim 1, wherein other parts of the device are also adapted to be heated by the heating means.

11. A safety device according to claim 1, wherein said cushion means in the rest position is also adapted to be heated by the heating means.

12. A safety device according to claim 1, further comprising a cooling water temperature indicating means interconnected with a vehicle cooling system for indicating the readiness of the gas cushion system.

13. A safety device according to claim 12, wherein said cooling water temperature indicating means is used directly as readiness indicator.

14. A safety device according to claim 12, wherein said cooling water temperature indicating means is used as a component of the readiness indicator.

15. A safety device according to claim 1, wherein said heating means includes a jacket disposed substantially around said gas source means for maintaining the temperature thereof within predetermined limits.

16. A safety device according to claim 15, wherein said jacket is a fluid jacket operatively connected to the cooling system of the vehicle.

17. A safety device according to claim 16 wherein said gas source means includes a compressed gas tank.

18. A safety device according to claim 17, wherein said means for automatically inflating said gas cushion means includes a powder charge.

19. A safety device according to claim 18, wherein said control means includes a thermostat means for controlling the temperature of said jacket.

20. A safety device according to claim 19, wherein a temperature indicating means is provided for indicating the readiness of the gas cushion system.

* * * * *